United States Patent [19]

Horvath

[11] 4,454,850
[45] Jun. 19, 1984

[54] APPARATUS AND METHOD FOR ENERGY CONVERSION

[75] Inventor: Stephen Horvath, St. Ives, Australia

[73] Assignee: Beeston Company Limited, Hong Kong

[21] Appl. No.: 318,173

[22] Filed: Nov. 4, 1981

Related U.S. Application Data

[63] Continuation of Ser. No. 56,863, Jul. 12, 1979, abandoned.

[30] Foreign Application Priority Data

Jul. 14, 1978 [AU] Australia .................. PD5083

[51] Int. Cl.³ .................................. F02M 27/06
[52] U.S. Cl. .................. 123/537; 123/527; 123/538; 123/1 A; 123/DIG. 12; 376/146; 376/318
[58] Field of Search .............. 123/DIG. 12, 1 A, 3, 123/536, 537, 538, 527, 169 EL, 169 MG; 60/39.46 G; 376/318, 317, 146, 148

[56] References Cited

U.S. PATENT DOCUMENTS

| 1,943,674 | 1/1934 | Woods-Humphery et al. | 123/169 EL |
| 2,305,208 | 12/1942 | Trammell et al. | 123/169 EL |
| 3,110,294 | 11/1963 | Nyman | 123/536 |
| 3,362,883 | 1/1968 | Wright | 123/DIG. 12 |
| 3,980,053 | 9/1976 | Horvath | 123/DIG. 12 |
| 4,052,139 | 10/1977 | Paillaud et al. | 123/1 A |
| 4,069,665 | 1/1978 | Bolasny | 123/538 |
| 4,304,627 | 12/1981 | Lewis | 376/148 |

FOREIGN PATENT DOCUMENTS

| 595554 | 2/1978 | Switzerland | 123/DIG. 12 |
| 349175 | 5/1931 | United Kingdom | 123/537 |
| 1508849 | 4/1978 | United Kingdom | |

OTHER PUBLICATIONS

C & EN, Apr. 2, 1979, pp. 33–47.
Weidner and Sells, Elementary Modern Physics–Alternate Second Edition, Feb. 1974, pp. 401–402.
Plasmas and Controlled Fusion, David J. Rose and Melville Clark, Jr., pp. 17–21, 1961.

*Primary Examiner*—Charles J. Myhre
*Assistant Examiner*—Andrew M. Dolinar
*Attorney, Agent, or Firm*—Biebel, French & Nauman

[57] ABSTRACT

Process and apparatus for liberation of energy by controlled nuclear fusion reaction involving isotopes of hydrogen gas. Highly ionized hydrogen gas containing a higher proportion of deuterium than in naturally occurring hydrogen is pressurized, together with an oxidizing gas within combustion chamber of reciprocating piston and cylinder engine. An electrical discharge within the combustion chamber causes generation of heat by atomic dissociation and exothermal recombination of hydrogen atoms and electrical excitation of ionized gas. Ionized deuterium in the hydrogen gas undergoes a nuclear fusion reaction with consequent liberation of heat energy and remaining hydrogen gas burns in the oxidizing gas to provide control on fusion reaction. Apparatus for producing ionized hydrogen gas in appropriate form by treatment of normal industrial hydrogen gas is disclosed, and also gas mixing apparatus for mixing the ionized hydrogen with atmospheric air as the oxidizing gas.

2 Claims, 28 Drawing Figures

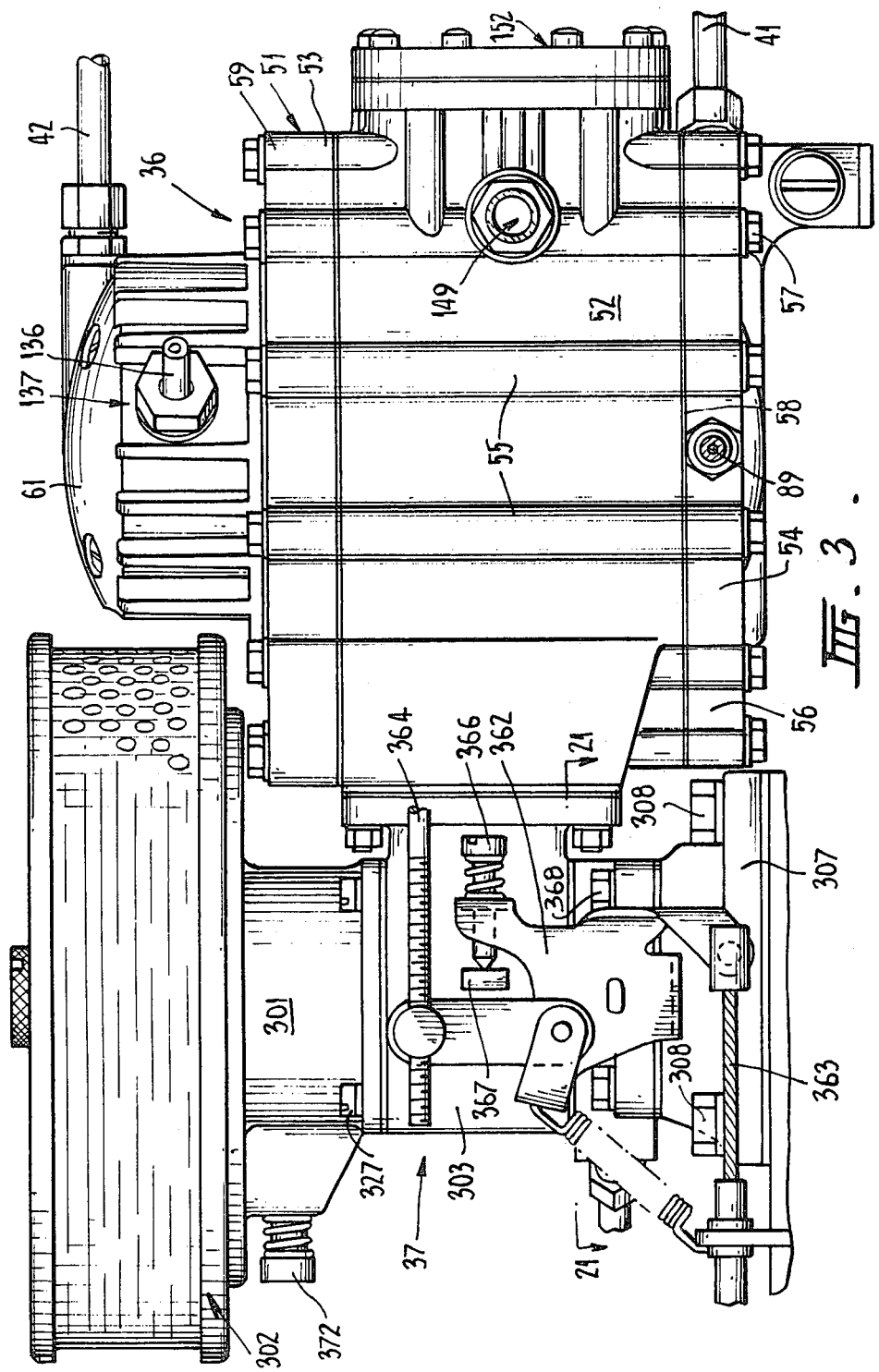

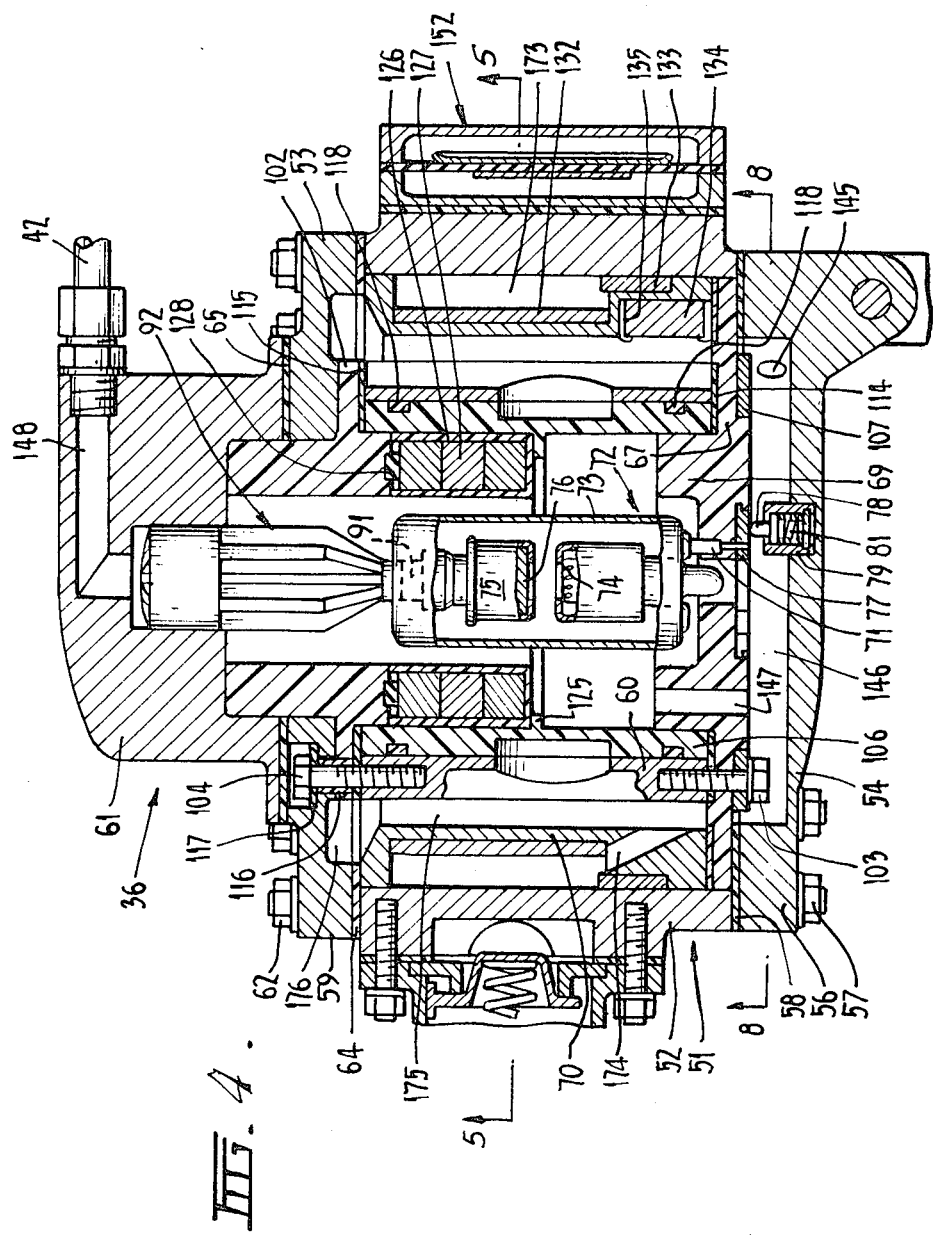

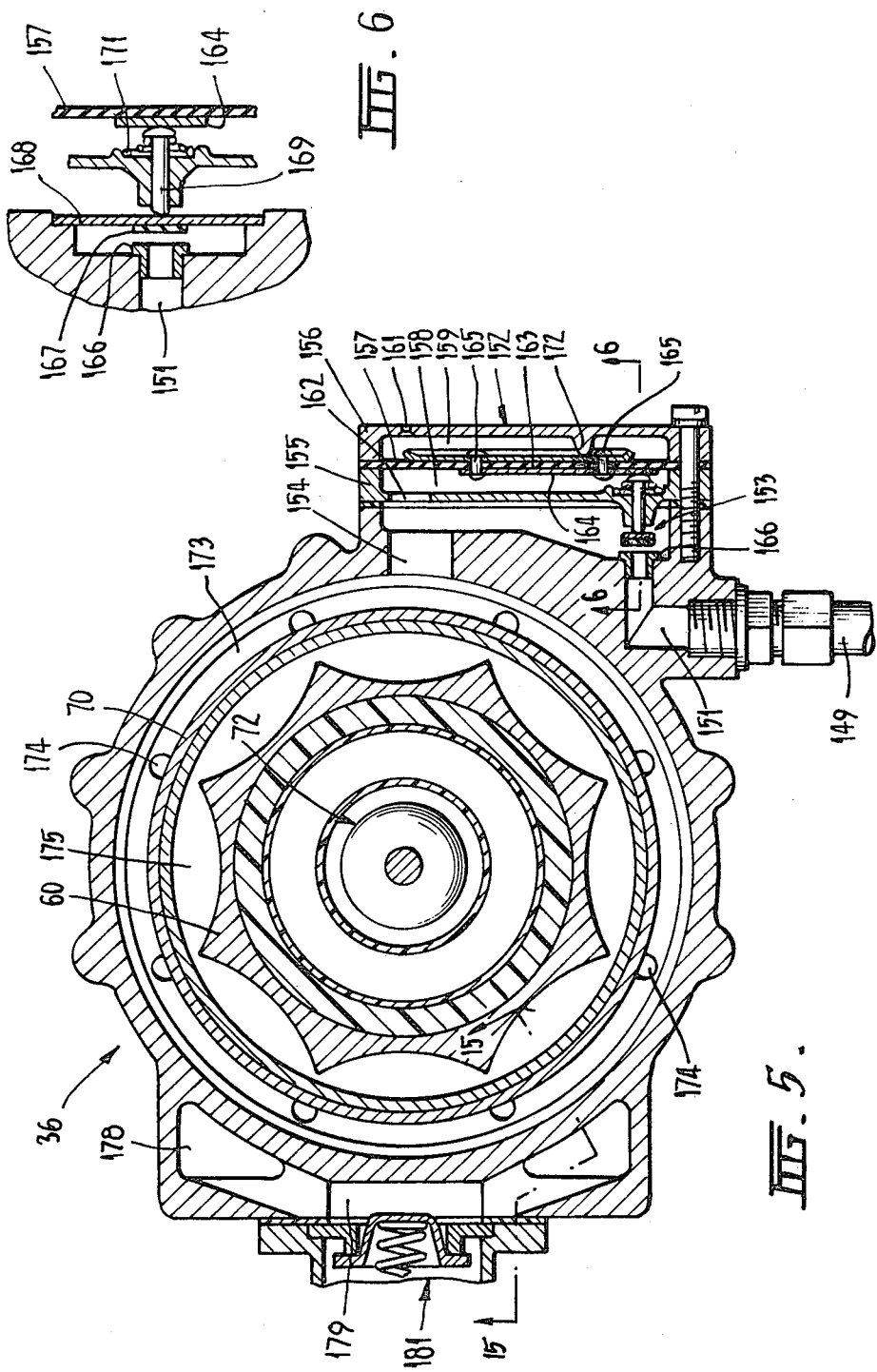

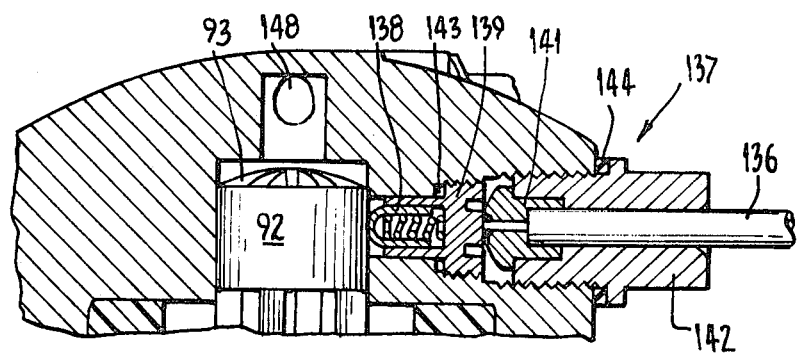
FIG. 7.
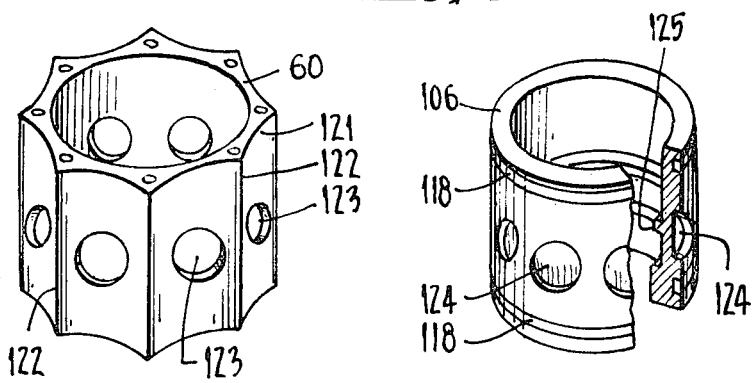
FIG. 9.
FIG. 10.
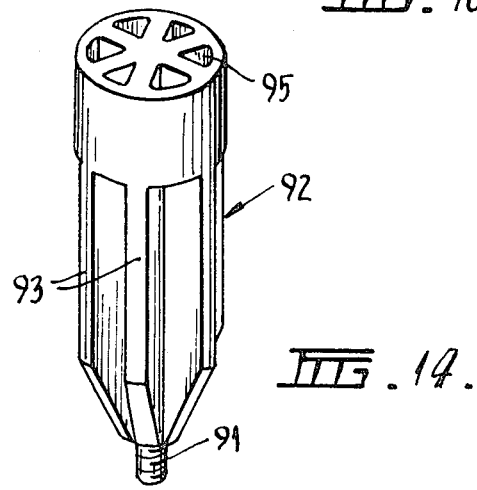
FIG. 14.

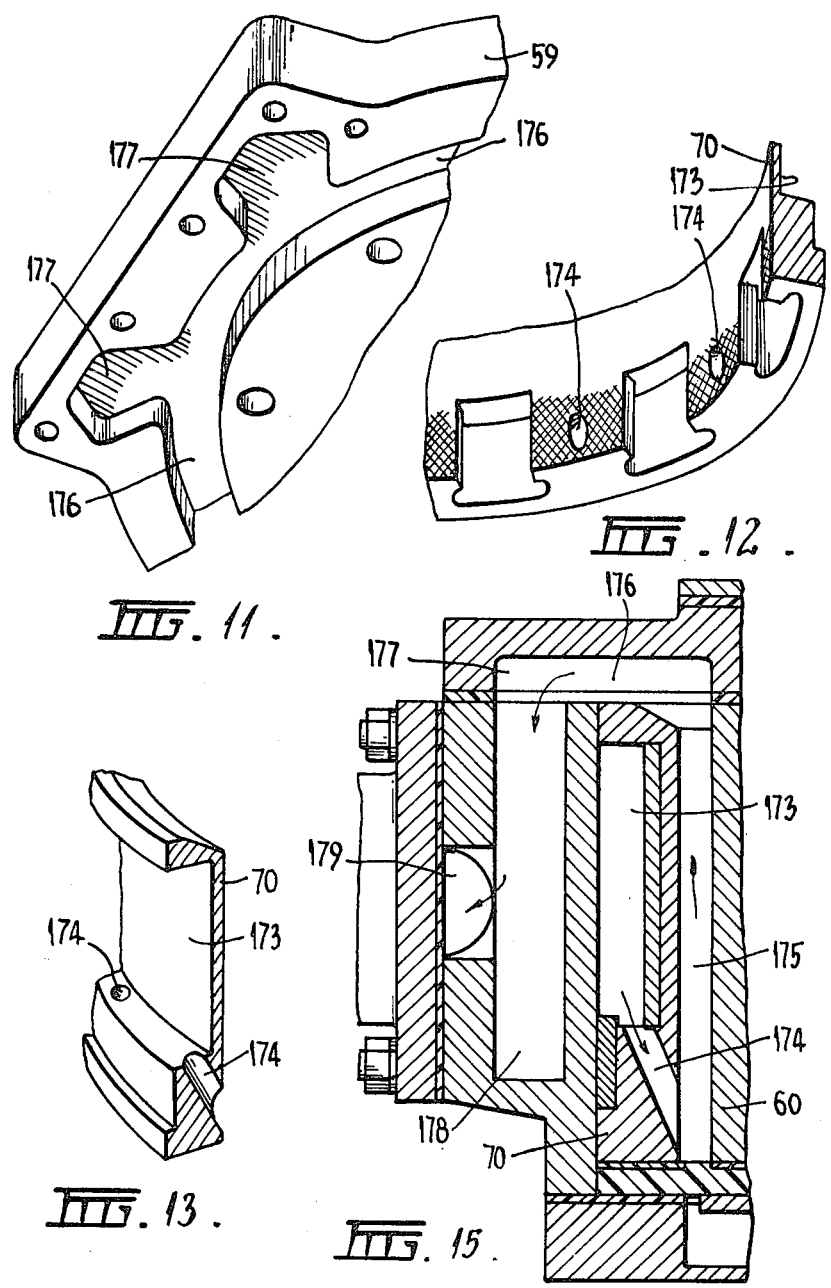

APPARATUS AND METHOD FOR ENERGY CONVERSION

This is a continuation of application Ser. No. 56,863 filed July 12, 1979, now abandoned.

BACKGROUND OF THE INVENTION

This invention provides a process and apparatus by means of which energy may be liberated by a controlled nuclear fusion reaction involving isotopes of hydrogen gas.

Nuclear fusion reactions are known to be the energy source in two widely different situations. At one extreme, relatively slow reactions produce the energy of the sun and other stars and at the other extreme repeated nuclear fusion reactions are responsible for the explosive power of thermonuclear weapons. In both cases, however, the reactions proceed at extremely high temperatures and the liberation of energy is uncontrolled. By the present invention it is possible to bring about a nuclear fusion reaction under conditions which enable energy to be released in a controllable manner.

SUMMARY OF THE INVENTION

According to the invention there is provided a process wherein ionised hydrogen gas is introduced together with an oxidising gas into a combustion chamber and an electrical discharge is created within the combustion chamber to initiate combustion of the hydrogen with the oxidising gas. Preferably the electrical discharge is such as to cause dissociation of hydrogen molecules in the chamber to hydrogen atoms which atoms recombine exothermally to generate heat in the chamber in addition to that generated by the combustion of hydrogen.

Preferably, too, the heat generated in the chamber is sufficient to cause ionised deuterium in the hydrogen gas to undergo a nuclear fusion reaction with consequent liberation of heat energy. For this purpose it is preferred that the ionised hydrogen introduced into the combustion chamber have a higher proportion of deuterium than in naturally occurring hydrogen. The invention accordingly also provides a process comprising the steps of:

producing ionised hydrogen gas containing a higher proportion of deuterium than in naturally occurring hydrogen, introducing said ionised hydrogen gas together with an oxidising gas into a combustion chamber, closing the combustion chamber, and creating within the combustion chamber an electrical discharge to cause generation of heat within the chamber by atomic dissociation and exothermal recombination of hydrogen atoms as well as by combustion of hydrogen with the oxidising gas whereby to cause ionised deuterium in the hydrogen gas to undergo a nuclear fusion reaction with consequent liberation of heat energy.

Preferably, the ionised hydrogen gas and oxidising gas are pressurised to above atmospheric pressure in said combustion chamber before combustion. More particularly these gases should be pressurised to a pressure of at least 60 p.s.i.

The invention also provides apparatus comprising, in combination;

gaseous fuel burning plant having a combustion chamber to receive gaseous fuel, means to produce ionised hydrogen gas, means to introduce said ionised hydrogen gas together with an oxidising gas into said chamber; and means to create an electrical discharge within the chamber.

Said fuel burning plant may be in the form of an internal combustion engine. More particularly this engine may be of the reciprocating piston and cylinder type in which case the combustion chamber may be one of a plurality of such chambers defined between pistons and a cylinder head of the engine.

The ionised hydrogen gas may be produced by conversion of water by a process involving electrolysis and radiolysis in which the electrolyte is irradiated with short wavelength electromagnetic radiation, more specifically radiation of wavelength less than $10^{-10}$ meters. One suitable method and apparatus for producing hydrogen gas in suitable form for the present invention, as well as oxygen which can serve as at least part of the oxidising gas in the process of the present invention, is described in U.S. Pat. No. 4,107,008.

Alternatively, hydrogen gas in a form suitable for use in accordance with the present invention can be produced by conversion of normal hydrogen gas prepared by conventional industrial processes, the conversion requiring irradiation of the gas with short wavelength electromagnetic radiation, preferably in the presence of an intense magnetic field.

In order that the invention may be more fully explained one particular embodiment will be described in detail with reference to the accompanying drawings.

BRIEF DESCRIPTION OF THE DRAWINGS

FIG. 3 is a side elevation of the gas conversion apparatus and gas mixer;

FIG. 4 is a vertical cross-section through the horizontal conversion apparatus taken generally on the line 4—4 in FIG. 2;

FIG. 5 is a horizontal cross-section through the hydrogen conversion apparatus taken generally on the line 5—5 in FIG. 4;

FIG. 6 is a scrap cross-section on the line 6—6 in FIG. 5;

FIG. 7 is a scrap cross-section generally on the line 7—7 in FIG. 2;

FIGS. 9 to 14 are perspective views showing details of components in the hydrogen conversion apparatus;

FIG. 15 is a vertical cross-section taken generally on the line 15—15 in FIG. 5;

FIG. 26 illustrates the connection of an oil vapour extraction tube to the valve case of the engine.

DESCRIPTION OF THE PREFERRED EMBODIMENT

Figure 1:
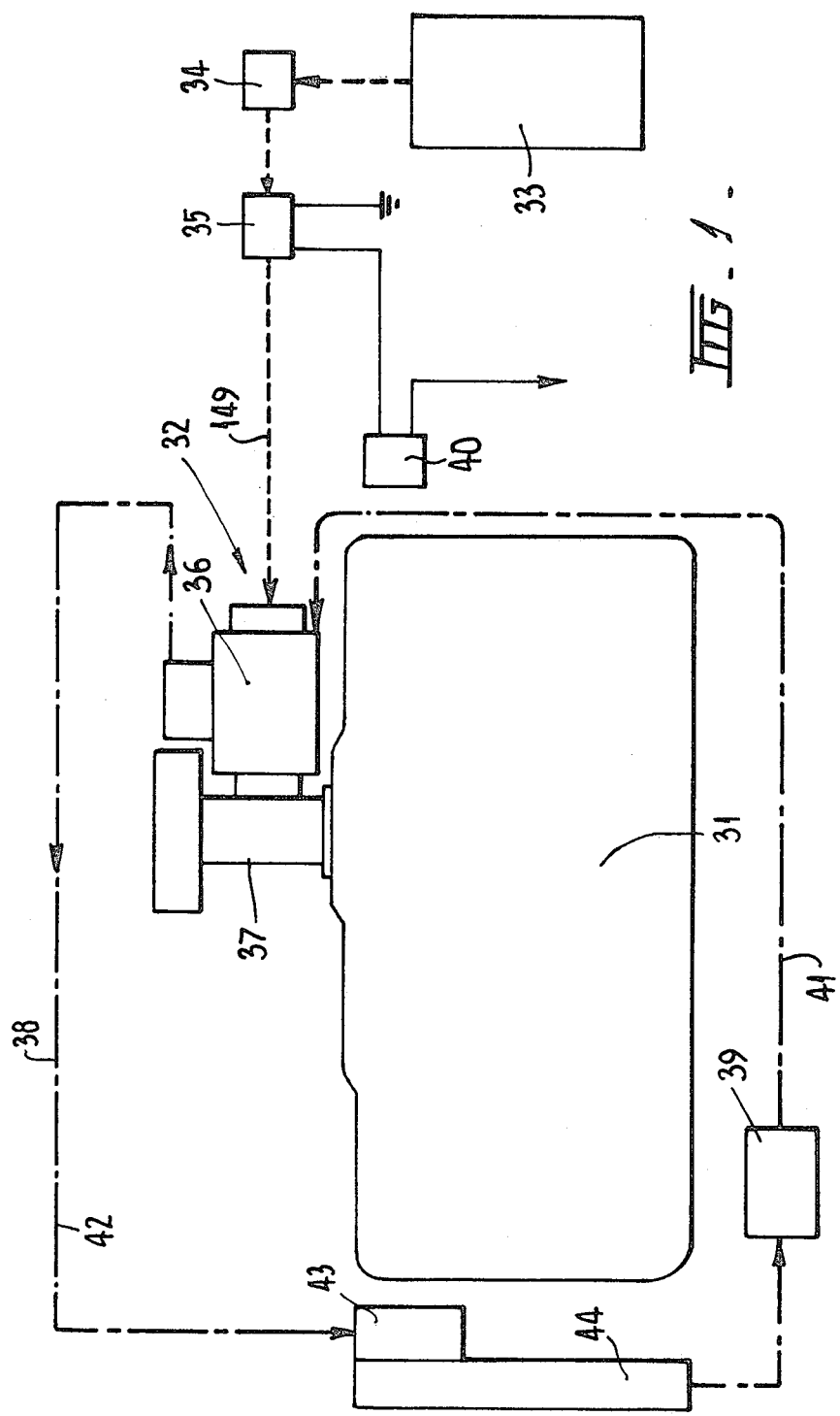
FIG. 1 is a diagrammatic plan view of an internal combustion engine fitted with a fuel supply system which incorporates a hydrogen gas conversion apparatus for converting normal commercially available hydrogen to a form suitable for use in accordance with the present invention and a gas mixer for mixing the converted hydrogen gas with air to provide a fuel mixture for the engine.

FIG. 1 shows diagrammatically an internal combustion engine 31 fitted with a fuel supply system denoted generally as 32. The fuel supply system comprises a gas tank 33 to receive industrial hydrogen gas. Gas from tank 33 passes through a primary pressure regulator 34 and a solenoid valve 35 which is contracted by a vacuum operated switch 40 sensitive to the vacuum pressure in the fuel intake manifold of the engine. The gas then passes to a hydrogen gas conversion apparatus 36 which converts it to highly ionized hydrogen gas having a significantly high proportion of deuterium. The thus converted gas passes to a gas mixer 37 wherein it is mixed with atmospheric air to produce a gas mixture which is introduced as fuel into the engine.

The engine is of the reciprocating piston and cylinder type. It may be a conventional automobile engine in which the usual hydrocarbon fuel delivery system (carburetter or fuel injection system) is replaced by the hydrogen fuel supply system and which is fitted with special electrical discharge devices to be described below.

The hydrogen gas conversion apparatus 36 requires a forced flow oil circulation system and this system is indicated generally as 38 in FIG. 1. It incorporates a pump 39 which delivers oil through a pipe 41 to the bottom of conversion apparatus 36. As will be described below, the oil flows upwardly through the conversion apparatus 36 and thence through a further duct 42 to an oil reservoir 43 and oil cooling radiator 44 and back to the pump for recirculation.

Figure 2:
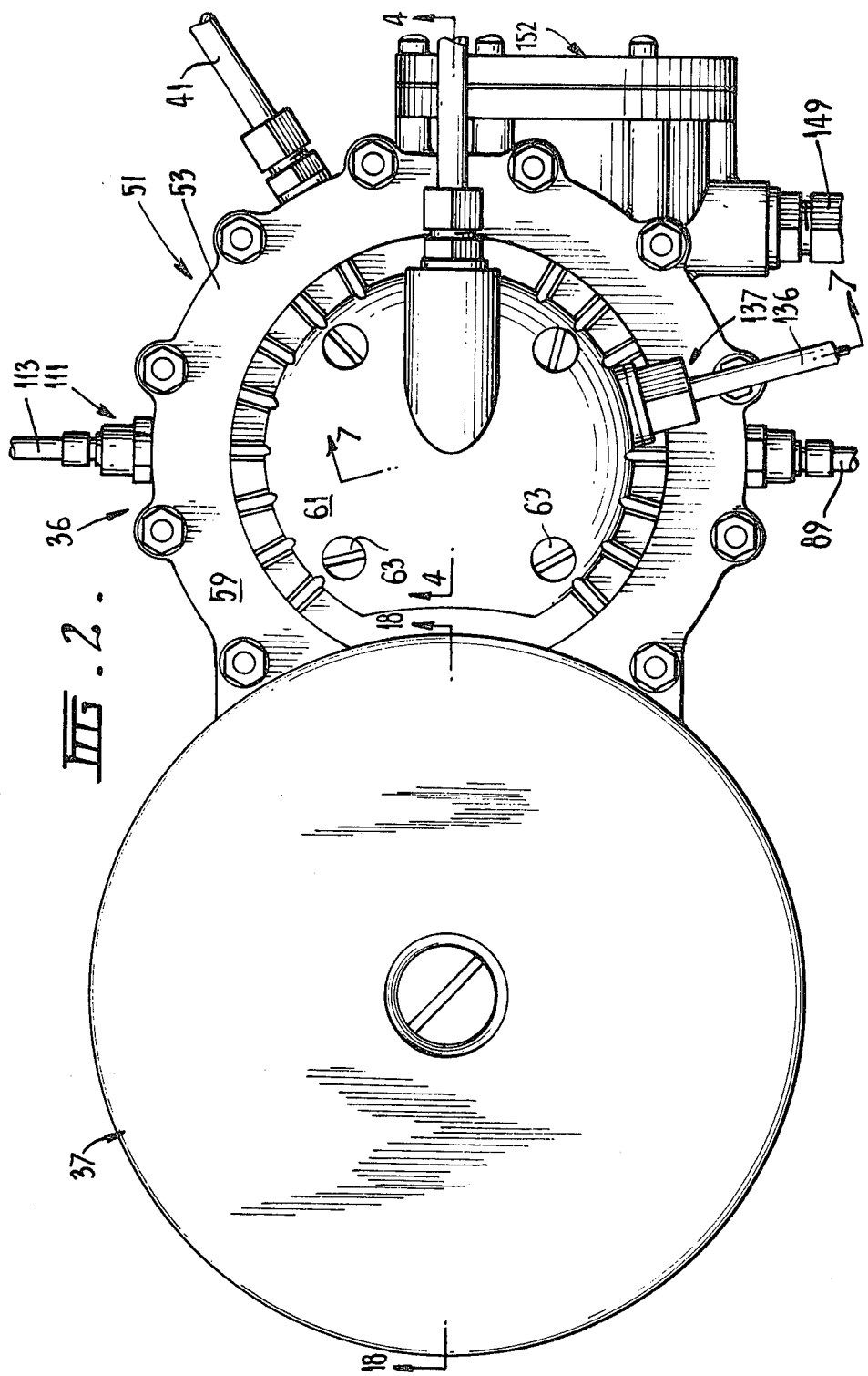
FIG. 2 is a plan of the hydrogen conversion apparatus and gas mixer.

As seen most clearly in FIGS. 2 and 3 the hydrogen gas conversion apparatus 36 and the gas mixer 37 may conveniently be constructed as a single assembly which bolts directly on to the head of engine 31.

The construction of gas conversion apparatus 36 is fully illustrated by FIGS. 2 through 12. It comprises an outer casing 51 having a cast aluminium tubular body 52 and top and bottom closures 53, 54. The peripheral wall of the casing incorporates cooling fins 55 and the top and bottom closures are formed with extensions of these fins Bottom closure 54 is comprised of a non-magnetic stainless steel bottom plate 56 which is clamped to the bottom end of casing body 52 by means of clamping bolts 57 which screw into tapped holes in the body wall. The interface between bottom plate 56 and body 52 is sealed by an annular gasket 58.

Top closure 53 is comprised of a non-magnetic stainless steel top plate 59 and a plastic cover 61. Top plate 59 is fastened to the upper end of casing body 52 by ten clamping bolts 62 which screw into tapped holes in the casing body and plastic cover 61 is fastened to top plate 59 by four fastening screws 63 so as to cover a central opening in the top plate. The interface between top plate 59 and casing body 52 is sealed by an annular gasket 64 and the interface between the top plate and plastic cover 61 is sealed by an annular gasket 65.

In the gas conversion apparatus, the hydrogen gas is passed upwardly through an annular chamber formed between a tubular electrical anode 60 and a tubular cathode 70 surrounding the anode. Cathode 70, which will be described in detail below, fits closely within the peripheral wall of casing body 52. Its upper end engages gasket 64 and its lower end provides an abutment for the outer rim of a plastic bottom disc 67 which is held clamped to the bottom of the cathode by the bottom plate 56. A sealing gasket 68 is located between the bottom end of the cathode assembly and the plastic bottom disc 67.

Plastic bottom disc 67 has a central boss portion 69 which is provided with five socket holes to receive five pins 71 of a short wave length electromagnetic radiation tube denoted generally as 72 which is disposed centrally within the casing. Radiation tube 72 comprises a partially evacuated glass-walled envelope 73 which houses a shielded filament winding 74 and an anode 75 having a tungsten insert 76 providing a flat target surface. One end of filament winding 74 is electrically connected to one of the five terminal pins 71 to provide a positive current connection. The other end of filament 74 is connected to all of the remaining four pins 71 to provide a common negative or earth connection.

Figure 8:
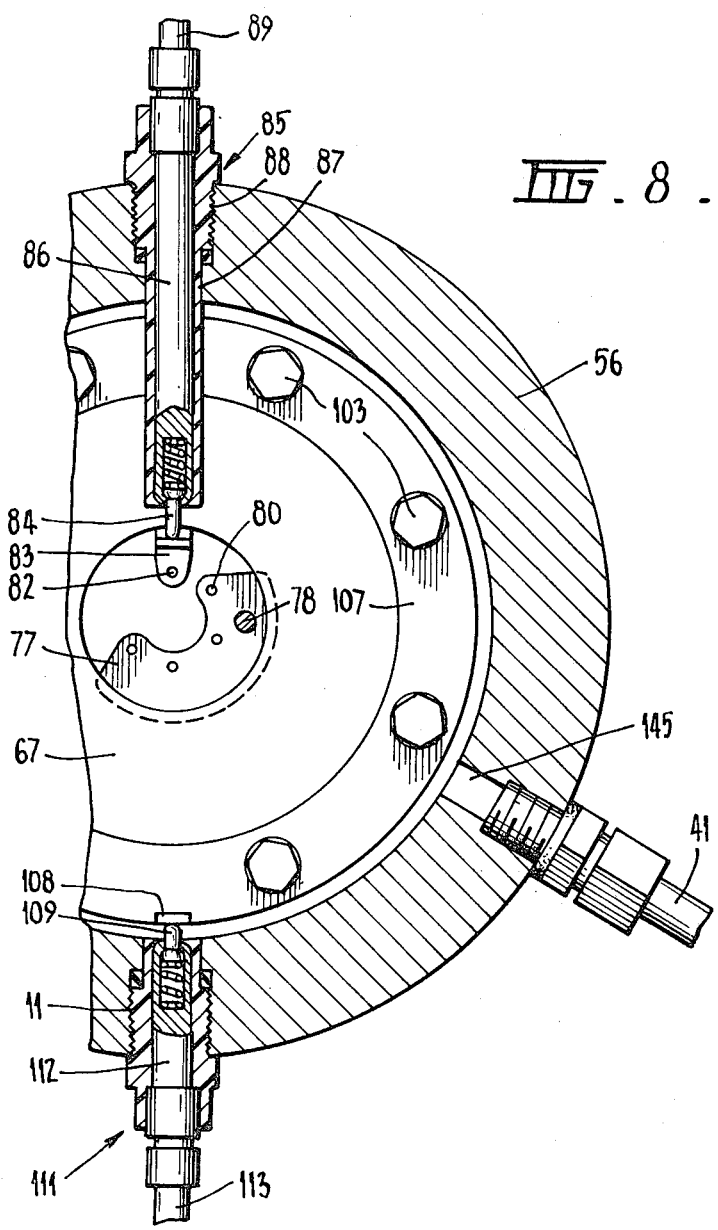
FIG. 8 is a cross-section generally on the line 8—8 in FIG. 4.
Figure 16:
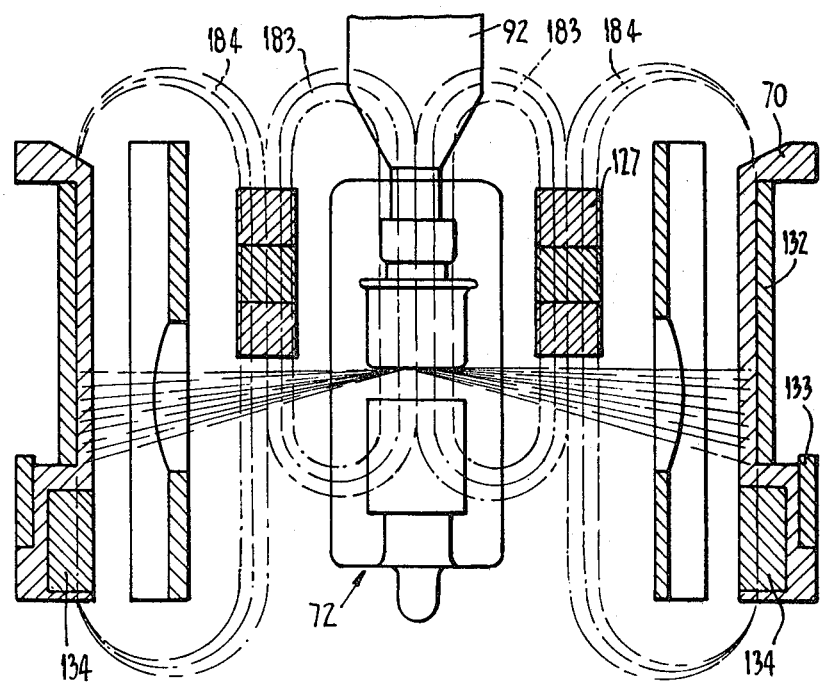
FIG. 16 is a vertical cross-section through the vital components of the hydrogen conversion apparatus and illustrates diagrammatically paths of electromagnetic radiation and magnetic fields within the device.

As indicated in FIGS. 4 and 8, the four earthing pins of tube 72 engage holes 80 in a horse-shoe shaped metal plate 77 fitted within a recess in the underside of plastic bottom disc 67. Plate 77 is engaged by a spring-loaded electrical contact plunger 78. Contactor 78 is mounted in a metal tube 79 carrying the loading spring 81 and fitted to bottom cover plate 56 to provide an earthing connection through the outer casing. The single positive electrical supply pin 71 of tube 72 engages a hole 82 in a metal tag 83 on plastic bottom disc 67 and this tag is engaged by a spring-loaded contact plunger 84 carried at the inner end of an electrical connector assembly 85 which extends radially inwardly through the outer casing. Connector assembly 85 comprises a central conductor 86 formed of gold plated brass housed within a plastic sheath 87 having an external screw threaded portion 88 to screw into a tapped opening in the side of the casing. Conductor 86 is connected to an electrical supply lead 89 which provides positive DC voltage to the filament winding 74 of the radiation tube.

The anode 75 of the radiation tube is connected by a screw connection 91 to a gold-plated brass terminal 92 the construction of which is most clearly seen in FIGS. 4 and 14. This terminal serves as an electrical connector through which to supply high voltage to the anode of radiation tube 72 and also as a heat sink for the radiation tube. The lower part of terminal 92 has circumferentially spaced longitudinal fins 93 whereas the upper part has a smooth cylindrical periphery 94 and a series of six longitudinally extending internal passages 95 which extend downwardly through the upper portion to communicate with the spaces between the fins 93 in the lower part of that component. The upper end of terminal 92 projects into a hole 96 in the underside of plastic cover 61.

As seen in FIG. 7, the radiation tube terminal 92 is connected to a high voltage input lead 136 via an electrical connector 137 which screws into one side of plastic cover 61 and is fitted with a spring loaded electrical contact 138 which engages the upper end portion of terminal 92. Connector 137 is made in two pieces, the first piece comprising a conductor 139 which screws directly into the plastic cap 61 and carries the spring loaded contact 138 and the second piece comprising a gold plated conductor 141 which is clamped against the conductor 139 by a plastic connector body 142 fitted to a larger threaded bore in the plastic cap, the connector 141 being connected to the end of the supply lead 136. Two oil seal gaskets 143, 144 are provided. The supply lead 136 can be disconnected by screwing body 142 out of plastic cap 61, to leave conductor 139 and the spring loaded contact 138 in position and thereby maintain the oil seal provided by gasket 143.

Radiation tube 72 is surrounded by the tubular anode 60 within which is force fitted a thick plastic liner sleeve 106, the construction of these components being illustrated in FIGS. 9 and 10. Anode 60 is clamped between bottom plastic disc 67 and upper plastic disc 102 by means of eight lower clamping bolts 103, and eight upper clamping bolts 104. The stems of bolts 103, which are made of anti-magnetic stainless steel, screw into tapped holes in the bottom of anode 105 and their heads bear against a gold plated glass ring 107 fitted to the underside of plastic bottom disc 67. As indicated in FIG. 8 ring 107 is provided with a tag or ear 108 which is engaged by a spring loaded electrical contact 109 carried at the inner end of an electrical connector 111 extending radially inwardly through the outer casing. Connector 111 comprises a central gold-plated brass conductor 112 disposed within a plastic sheath 110 which screws into a tapped hole in the outer casing. Conductor 112 connects the contact 109 to an electrical lead 113 which is connected to a supply of direct current positive voltage. This voltage is thus supplied via contact 109, ring 107 and bolts 103 to the anode 60.

A gasket 114 is compressed between the lower plastic disc 67 and the bottom ends of the anode 105 and anode liner 106 and a similar gasket 115 is compressed between the outer rim of the upper plastic disc 102 and the upper ends of the anode and anode liner. The upper clamping bolts 104 extend through plastic sleeves 116 and their heads, which fit into counter-bores in upper metal cover plate 59, bear against electrically insulating fibre washers 117. The anode is thus electrically insulated from the upper metal cover plate.

A pair of O-ring seals 118 are disposed in circumferential grooves in the outer periphery of anode liner 106 adjacent the top and bottom ends of the anode assembly so as to form seals against leakage of oil which flows through the interior of the anode.

Anode 60 is made of gold-plated brass and, as is most clearly seen in FIGS. 5 and 9, its outer periphery is machined to form eight circumferentially spaced flutes 121 which have arcuate surfaces meeting at sharp crests 122 defined between the flutes. The whole of the outer peripheral surface of the anode is knurled to produce small pyramidal projections so as to increase the effective surface area of the anode.

The tubular wall of the anode is perforated by eight holes or windows 123 disposed centrally of the flutes (i.e., midway between crests 122) and approximately midway between the ends of the anode. Referring to FIGS. 4 and 10, the outer periphery of anode liner 106 has eight blind bores 124 which register with the holes 123 in the anode when the liner is fitted into the anode. The liner can thus serve to retain oil within the anode but the wall thickness of the liner is reduced to a minimum at the anode holes 123 so as to present minimum obstruction to the short wave-length electromagnetic radiation generated by radiation tube 72 as that radiation spreads out from tube 72 and through the anode holes.

Anode liner tube 106 has an inner circumferential flange 125 which supports an annular plastic casing 126 containing a stack of three annular permanent magnets 127. These magnets are firmly held in position within the upper part of the anode by six rubber pads 128 which are compressed between the uppermost magnet and the upper plastic disc 102. As will be described below magnets 127 produce a strong magnetic field within the gas conversion apparatus. In order to produce the highest possible flux density they are preferably of the cobalt samarium type.

The outer periphery of cathode 70 is recessed to receive lead rings 132, 133 which serve as radiation shielding. Unlike the anode, the cathode is made of a magnetic material. Preferably, it is constructed of nickel-plated mild steel. Its bottom portion is formed with eight circumferentially spaced slots which receive eight rectangular magnets 134 held in position by keeper plates 135. Magnets 134 are also preferably of the cobalt samarium type.

Cathode 70 is a neat fit within the peripheral wall of the outer casing and it is installed so that the eight cathode magnets 134 are radially aligned with the centres of anode flutes 121 i.e., they are disposed radially outwardly and vertically downwardly from the anode holes 123. The cathode is earthed through its contact with the outer casing.

Gas conversion apparatus 36 has a forced flow oil circulation system whereby oil is passed into the bottom of the apparatus and upwardly through the interior of the anode assembly to completely surround radiation tube 72 whereafter it passes out from the top of the apparatus and is re-circulated. The oil displaces air from the interior of the apparatus, which might otherwise cause sparking to occur between radiation tube 72 and other components of the apparatus, and it also serves to extract heat from the apparatus and thus prevent overheating of the radiation tube. The oil is delivered from pump 39 via pipe 41 to an oil inlet passage 145 in the bottom metal cover plate 56 of outer casing 51. The oil is thus delivered to the cavity 146 between bottom plate 56 and the bottom plastic disc 67 whence it flows upwardly through six oil flow holes 147 in the central boss portion of disc 67 into the interior of the anode. The oil flows upwardly through the anode and around the radiation tube and thence upwardly through the interior of the upper plastic disc 102. It thus flows around the finned lower part of the radiation tube terminal member 92 and is directed by fins 93 upwardly through the passages 95 in the upper part of member 92 to an oil outlet passage 148 in plastic cover 61 and thence to the oil outlet pipe 42. As already described with reference to FIG. 1 pipe 42 directs the oil back to the pump 39 via reservoir 43 and cooling radiator 44.

Because of its finned and gold-plated brass construction the radiation tube terminal member 92 provides excellent heat transfer from the radiation tube to the circulating oil.

Hydrogen gas from tank 33 is delivered to conversion apparatus 36 via the primary pressure regulator 34 and solenoid valve 35. Primary pressure regulator 34 reduces the pressure of the gas to approximately 80 to 100 p.s.i. Solenoid valve 35 is controlled by vacuum operated switch 40 in response to the vacuum pressure within the intake manifold of engine 31. This ensures that the supply of hydrogen gas is cut off when the engine is stopped.

The hydrogen gas is delivered from valve 35 via a pipe 149 to a gas inlet passage 151 in the outer casing 51 of the conversion apparatus whence it flows into a secondary pressure regulator 152 fitted to the casing body 52. Secondary pressure regulator 152 incorporates a diaphragm operated inlet valve 153 which operates to produce at a gas outlet 154 a stream of hydrogen gas at a reduced pressure of 1.5 p.s.i. above atmospheric pressure. Regulator 152 comprises a diaphragm housing formed by two cup shaped metal members 155, 156 between which there is sandwiched a flexible diaphragm 157 dividing the interior of the housing into separate chambers 158, 159. Chamber 159, is exposed to atmospheric pressure via an opening 161 and chamber 158 is exposed to the regulator outlet pressure via a hole 162 in member 155. The central part of membrane 157 carries a stiffening metal disc 163 and a valve actuating metal strip 164 connected together by rivets 165.

The regulator inlet valve 153 comprises an inlet valve seat 166 and an opposing valve plate 167 mounted on a resilient strip 168, which can be flexed by movement of a spring loaded plunger 169 to move valve plate 167 toward and away from seat 166. Plunger 169 is biased by a spring 171 against the metal strip 164 on diaphragm 157. The stiffening disc 163 on the diaphragm engages a boss 172 on member 156 which serves as a fulcrum about which the diaphragm can pivot under the influence of the gas outlet pressure in chamber 158. An increase in gas outlet pressure causes the diaphragm to pivot so as to move valve plate 167 toward valve seat 166 thereby to restrict the gas flow and thereby counteract the pressure increase. The pressure of hydrogen gas delivered through the regulator outlet 154 is thus maintained substantially constant at 1.5 p.s.i. above atmospheric.

The gas outlet 154 from secondary regulator 152 delivers hydrogen gas to an annular space 173 formed between the cathode and the outer casing because of the external peripheral recess in the cathode. The gas flows from the bottom of space 173 through eight holes 174 extending downwardly and inwardly through the bottom part of the cathode so as to deliver the gas into the bottom of the annular space 175 between the anode and cathode. The gas flows upwardly through this annular space to an annular gas collecting groove 176 formed in the underside of the upper metal cover plate 59. As seen in FIG. 11 groove 176 communicates with a pair of outwardly extending slot extensions 177 at one side of the apparatus. These slot extensions register with downwardly inclined passages 178 in casing body 52 and the gas is delivered downwardly through these passages to a gas outlet chamber 179 whence it passes to the gas mixer 37 via a one way valve 181.

Before describing the electrical circuitry for the hydrogen gas conversion apparatus, the general operation of that apparatus will be described. A constant DC potential of 12 volts is applied between anode 60 and cathode 70. The filament winding 74 of radiation tube 72 is supplied with a regulated positive voltage of 2.65 volts and a very high pulsating DC voltage is applied between the filament and the anode 75 of the radiation tube. Typically the voltage between the filament and the anode will be 40 Kv with a superimposed ripple voltage of 2–4 Kv. Under these conditions, the electron bombardment of the anode produces a 360° band of radiation indicated by the dotted lines 182 in FIG. 14. As indicated by these dotted lines the band of radiation fans downwardly from the horizontal plane of the flat target surface of the radiation tube anode through a scattering angle of approximately 15°. The radiation comprises high energy photons of wave length less than $10^{-10}$ metres. Tests indicate that the radiation intensity from the tube is of the order of 3,000 Roentgen/hour. The creation of this high flux of photons is associated with release of large numbers of neutrons within the tungsten target of the radiation tube and the tube therefore also acts as a pulsed source of neutrons which radiate with the high energy photons in the radiation beam. The radiation beam extends outwardly through the holes 123 in anode 60 into the annular gas flow passage 175 and because of reflections from the cathode a band of the gas within that chamber is intensely irradiated. Thus the hydrogen gas passing upwardly through annular chamber 175 is subjected to intense short wavelength electromagnetic radiation and an associated pulsed stream of neutrons.

The anode magnets 127 and cathode magnets 134 produce an intense magnetic field the shape of which is indicated by the dashed lines 183, 184. The lines 183 indicate closed loop magnetic field lines which extend downwardly from anode magnets 127 to intersect the radiation beam at approximately 90° then curve inwardly and upwardly to extend vertically through the cathode of radiation tube 72 and through metal member 92 whereafter they curve outwardly and downwardly to the upper ends of the anode magnets. In the region between the radiation tube filament and anode the magnetic field serves to accelerate the electrons which bombard the radiation tube anode and so contributes to the energy of the radiation produced by the tube.

Lines 184 show outer field loops which extend from the bottom of anode magnets 127 and across to cathode magnets 134 whence they pass upwardly through the cathode and back in a closed loop to the upper end of the anode magnets. Cathode magnets 134 serve to shape these magnetic field lines so that they pass outwardly through the annular hydrogen gas flow chamber 175 in the region where the hydrogen is subjected to intense irradiation. The magnetic field in this region thereby provides preferred paths for the radiation photons which then tend to pass through the hydrogen chamber in radial directions and the interaction of the magnetic field with the radiation photons produces a "spin flip" effect in the protons within the hydrogen which increase their energy level.

Because of the intense irradiation with short wave length magnetic radiation and the potential difference applied between the anode and cathode, the hydrogen gas becomes highly ionized. Moreover, because of nuclear capture of neutrons associated with the radiation beam the ionized hydrogen gas which is produced will comprise a much high proportion deuterium (i.e., deuterons) than in naturally occurring hydrogen (i.e., greater than 0.0156%). Thus the hydrogen gas conversion apparatus 36 operates to convert normal industrial hydrogen gas to a highly ionized gas which has a significantly high proportion of deuterium.

In order to achieve the above results the magnetic field provided by magnets 127 and 134 should have a flux density greater than 500 Gauss within the gas flow chamber 175, and preferably of the order of 1800 Gauss.

Figure 17:
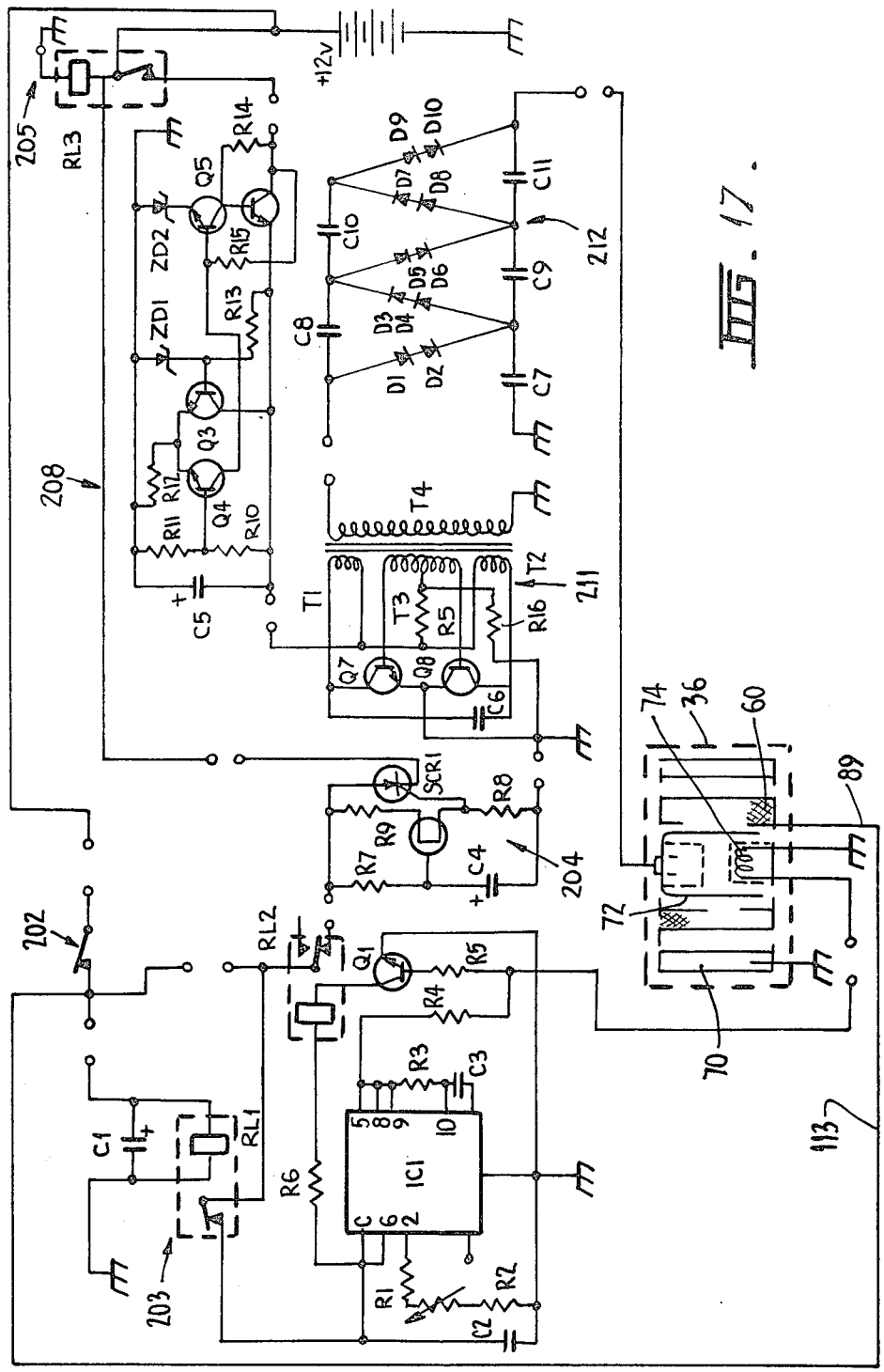
FIG. 17 is an electric circuit diagram for the apparatus illustrated in FIGS. 1 to 16.
Figure 18:
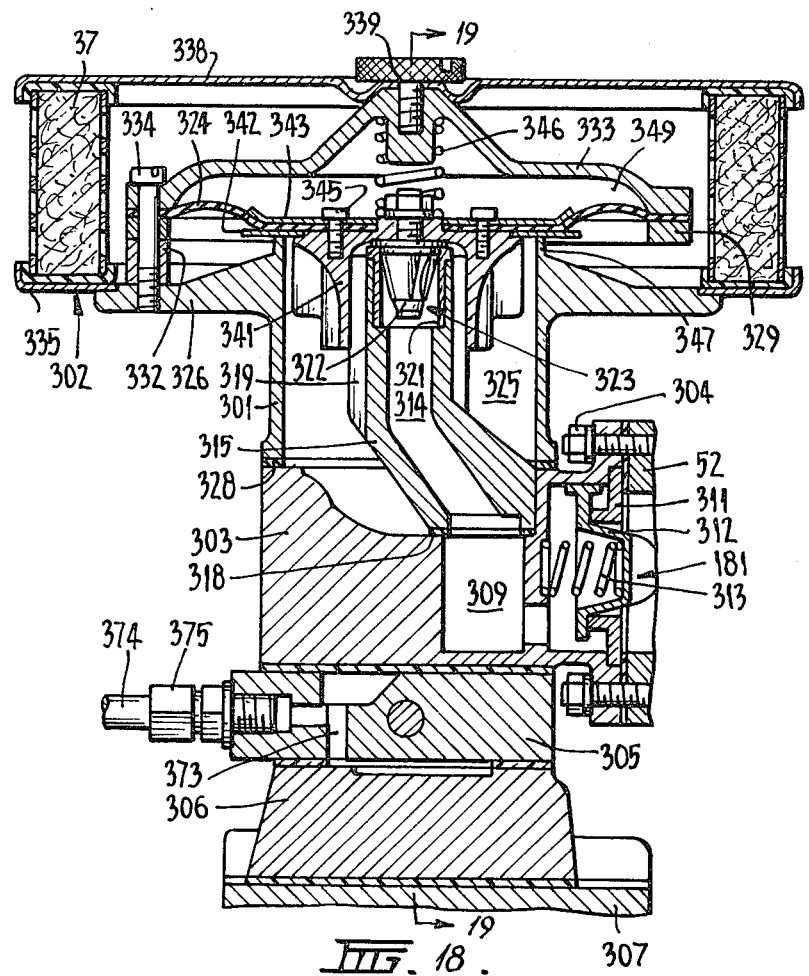
FIG. 18 is a vertical cross-section through the gas mixer taken generally on the line 18—18 in FIG. 2.
Figure 19:
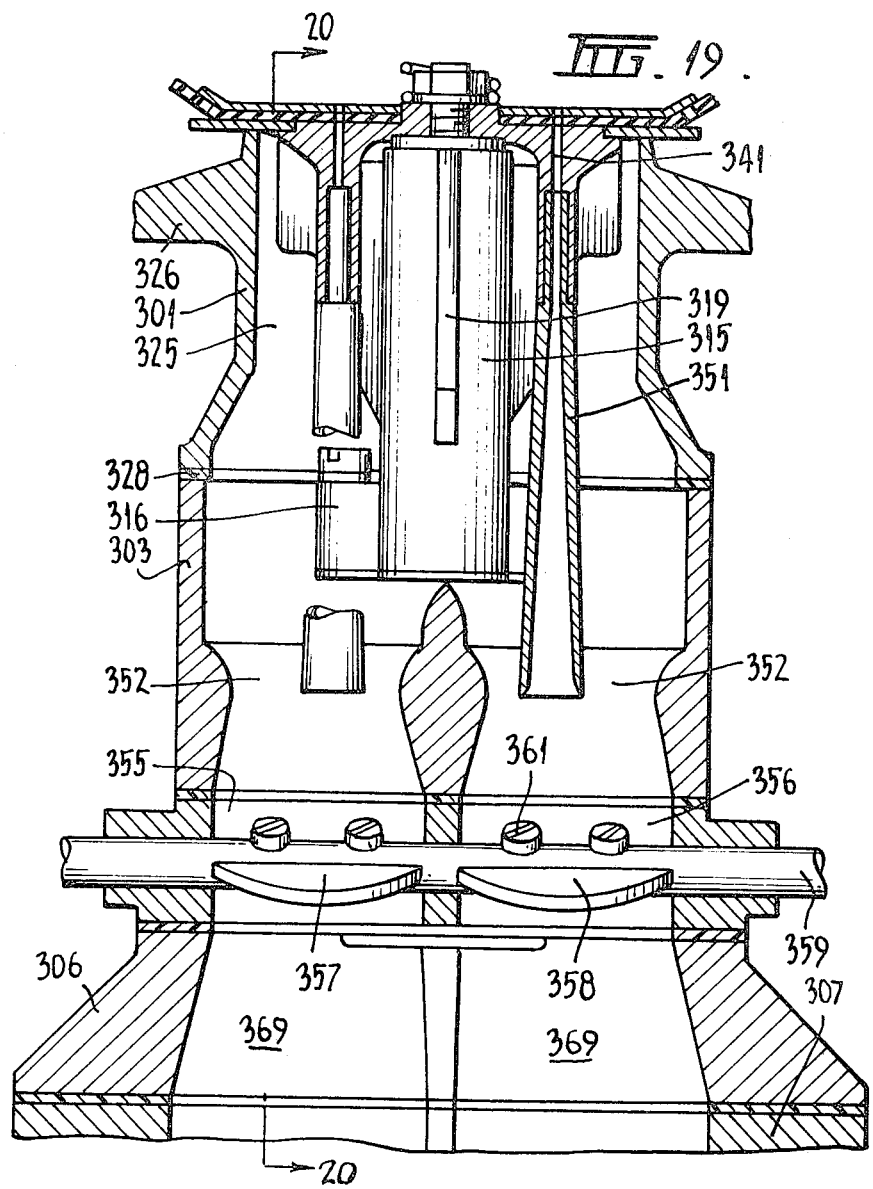
FIG. 19 is a cross-section on the line 19—19 in FIG. 18.

The electrical circuit for the apparatus is shown in FIG. 17. As shown in that Figure the circuitry is energised by a 12 volt battery 201. A simple on/off master control switch 202 provides positive voltage to a radiation tube filament voltage regulator denoted generally as 203 and to a timer circuit denoted generally as 204. The filament voltage regulator provides controlled positive voltage to the filament 74 of radiation tube 72. Timer 204 energises a master control relay 205.

Line 208 supplies a controlled positive voltage to an inverter circuit denoted generally as 211 which in turn supplies a square waveform of AC voltage to a voltage multiplier circuit 212 to produce the high voltage DC potential difference which is applied to radiation tube 72. This voltage is approximately 40 KV DC with a superimposed sharply spiked ripple of 2-4 KV.

The positive voltage for anode 60 of the gas conversion apparatus is provided through a switching power supply circuit denoted generally as 213 which is energised by the high power relay 209.

The major components of the electrical circuit will now be described sequentially in detail.

Filament Voltage Regulator (203)

When positive voltage is supplied through the master control switch 202 and energises the relay RL1 it will supply current to voltage regulator IC1 through the fixed contact of the relay. The same contact will supply current to timer 204 through the normally closed contact of relay RL2. Capacitor C1 is connected between the negative and positive supply lines and provides a delay of 1.5 seconds when relay RL1 turns off to ensure that the high voltage supplied to radiation tube 72 is turned off before the regulated filament voltage is turned off.

The output voltage of regulator IC1 is controlled by the set level of resistance of a resistor network R1, R2 and RV1 (variable resistor). Capacitor C2 acts to stabilise the circuit against input voltage supply transients. Resistor R3 isolates capacitor C3 from the output of the regulator IC1 and balances the input divider. Capacitor C3 is used to roll off the error amplifier in regulator IC1 and to provide frequency compensation. If the filament breaks transistor Q1 is turned on by current provided through resistor R4 and R5 and the relay RL2 to stop supply current to timer 204. The values of resistor R4 and R5 are selected to prevent sufficient current supply to energise relay RL2 during normal operation of the radiation tube. When transistor Q1 and relay RL2 are activated a resistor R6 drops the 12 volt supply to a level where it does not overload the 6 volt relay RL2.

Timer (204)

Time delay circuit 204 provides current to the master control relay 205. When power is supplied through the normally closed contact point of relay RL2, the capacitor C4 is charged through resistor R7 until the voltage across capacitor C4 reaches the trigger voltage of unijunction transistor Q2. The time delay is controlled by the ratio of capacitor C4 and resistor R7 and provides a delay of 2 to 3 seconds. When unijunction transistor Q2 turns on and discharges capacitor C4, through resistor R8, it provides a voltage pulse which is applied to the gate of SCR1 and will turn SCR1 on. The resistor R9 will control the pulsed current supplied to the gate of SCR1. Master control relay RL4 acts as a load for the device, and thus, when SCR1 turns on, the master control relay RL3 latches over and provides, through its contact point, positive voltage to drive the Inverter Voltage Regulator 208 and energises high power relay RL4.

Inverter Voltage Regulator (208)

The series pass voltage regulator 208 senses changes in the output voltage by the differential amplifier transistors Q3 and Q4 and its associated circuitry resistors R10, R11, R12 and R13 and zener diode ZD1. Resistor R13 provides for a large current to flow through ZD1 and since it is much larger than the current flowing through resistors R10 and R11 makes the reference voltage generated by zener diode ZD1 at point A virtually independent of changes in voltage.

If there is any change to voltage, this causes a complementary change in the base current to transistor Q5. This is achieved by using transistor Q4 to control the current through transistor Q5. Transistor Q5 is used as a common emitter driver and regulates the base current to the series pass transistor Q6. Zener diode ZD2 provides the reference voltage for this arrangement of transistors Q5 and Q6 and keeps the voltage at the base of Q6 constant and hence only varying the control current through transistor Q5. Resistors R14 and R15 provide correct biasing of transistors Q5 and Q6.

Capacitor C5 maintains low output impedance at high frequencies where the gain of transistors Q3 and Q4 is low. The value of resistor R12 is selected to draw sufficient operating current through transistors Q3 and Q4, such that transistor Q4 is in its active region for large possible variations in voltage. The Inverter Voltage Regulator receives 12 volt positive supply through master control relay 205 and provides a regulated voltage of approximately 8 volts to the Inverter 211.

Inverter (211)

The inverter is a DC to AC converter using a transistor oscillator. The transistors Q7 and Q2 are high speed switching devices and operate to provide an alternating high frequency current, frequency 3 KHz to 25 KHz, in primary coils T1 and T2. The starting signal applied to the centre tap of coil T3 is controlled by the resistor network provided by resistors R15 and R16 such that its magnitude will provide sufficient base drive to the transistors Q7 and Q3 to enable them to trigger alternatively. Transistors Q7 and Q8 will provide opposite flow of current in the coils T1 and T2 which alternates the flux in the ferrite core FC1 from positive to negative. The secondary coil generates a high voltage output by means of the large turns ratio between primary and secondary coils. The capacitor C6 will act as a filter and prevent input voltage transients.

Voltage Multiplier (212)

The input voltage to the voltage multiplier is the high voltage AC waveform from the inverter secondary winding T4. Typically this will be about 18 KV. The operation of the circuit can be described by considering alternative positive and negative cycles of the high voltage AC waveform. On the first positive half cycle the diodes D1 and D2 are forward biased and charge capacitor C7 to the peak value of the positive cycle. On the negative cycle following diodes D1 and D2 are reverse biased and diodes D3 and D4 are forward biased. Capacitor C7 discharges through diodes D3 and D4 to charge capacitor C8. At the next positive half cycle capacitor C7 is charged again by diodes D1 and D2 while the voltage across capacitor C8 forward biases diodes D5 and D6 which enables capacitor C8 to charge capacitor C9.

This process is repeated on the next negative half cycle charging capacitor C10 and in a similar fashion capacitor C11 is charged on the following positive half cycle. At this point (2½ complete cycles since the initiation of the sequence) capacitors C7, C9 and C11 are each charged to the full zero to positive peak voltage of the secondary winding T4 and since the capacitors are in series with each other the voltage with respect to earth at the output terminal of the voltage multiplier is three times the zero to peak value.

This process continues for as long as the input voltage is present and because of the rectifying action of diodes D1–D6.

The output, as well as being multiplied to three times the input voltage, is also rectified from an AC voltage to a DC voltage. However, the regulation of this type of circuit is such that the DC waveform has a fairly large superimposed AC ripple voltage. This is typically 2–4 KV in a total output voltage of 46 KV.

A complete components list for the illustrated circuit is as follows:

| | | | |
|---|---|---|---|
| $R_1$ | 10K OHM ¼ WATT | $C_1$ | 1000 μF ELECTROLYTIC |
| $R_2$ | 3K OHM ¼ WATT | $C_2$ | 1 μF TANTALUM |
| $R_3$ | 5.6K OHM ¼ WATT | $C_3$ | 2000 pF POLYESTER |
| $R_4$ | 0.68 OHM 5 WATT | $C_4$ | 10 μF TANTALUM |
| $R_5$ | 12K OHM ¼ WATT | $C_5$ | 2500 μF ELECTROLYTIC |
| $R_6$ | 68 OHM ¼ WATT | $C_6$ | .002 μF POLYCARBONATE |
| $R_7$ | 1 MEGOHM ¼ WATT | $C_7$ | 1800 pF 30KVWDC |
| $R_8$ | 220 OHM ¼ WATT | $C_8$ | 1800 pF 30KVWDC |
| $R_9$ | 470 OHM ¼ WATT | $C_9$ | 1800 pF 30KVWDC |
| $R_{10}$ | 2.2K OHM ¼ WATT | $C_{10}$ | 1800 pF 30KVWDC |
| $R_{11}$ | 2.7K OHM ¼ WATT | $C_{11}$ | 1800 pF 30KVWDC |
| $R_{12}$ | 680 OHM ¼ WATT | | |
| $R_{13}$ | 2K OHM ¼ WATT | | |
| $R_{14}$ | 33 OHM 5 WATT | | |
| $R_{15}$ | 100 OHM ¼ WATT | $Q_1$ | 2N3568 |
| $R_{15A}$ | 18 OHM 5 WATT | $Q_2$ | 2N2647 |
| $R_{16}$ | 1.5 OHM 5 WATT | $Q_3$ | 2N1304 |
| | | $Q_4$ | 2N1304 |
| | | $Q_5$ | 2N3055 |
| | | $Q_6$ | 2N6274 |
| | | $Q_7$ | 2N3773 |
| $R_{V1}$ | 10K OHM TRIMPOT | $Q_8$ | 2N3773 |
| $R_{L1}$ | 12V DC RELAY | $IC_1$ | MPC 1000 VOLT REGULATOR |
| $R_{L2}$ | 6V DC RELAY | | |
| $R_{L3}$ | 12V DC RELAY | | |
| | | $SCR_1$ | G.E. C106D |
| $D_1$ | ED1 7639 35KV | | |
| $D_2$ | ED1 7639 35KV | $FC_1$ | FERRITE "E" CORE |
| $D_3$ | ED1 7639 35KV | | |
| $D_4$ | ED1 7639 35KV | | |
| $D_5$ | ED1 7639 35KV | $Z_{D1}$ | B27 96 C6V2 105W |
| $D_6$ | ED1 7639 35KV | | |
| $D_7$ | ED1 7639 35KV | $Z_{D2}$ | 6.2V 10 WATT |
| $D_8$ | ED1 7639 35KV | | |
| $D_9$ | ED1 7639 35KV | | |
| $D_{10}$ | ED1 7639 35KV | | |

The highly ionized hydrogen gas produced by conversion apparatus 36 passes directly into gas mixer 37 which mixes the hydrogen with atmospheric air to produce a fuel mixture for the engine.

The construction of gas mixer 36 is shown in FIGS. 2, 3 and 18 through 25. It comprises an upper body portion 301 which carries an air filter assembly 302, an intermediate body portion 303 which is bolted to the casing of gas conversion apparatus 36 by means of bolts 304, and successive lower body portions 305, 306. The lowermost body portion is bolted to the inlet manifold 307 of the engine 31 by means of four studs 308.

The ionized gaseous fuel from the outlet chamber 179 of the gas conversion apparatus 36 is admitted via one-way valve 181 into a gas inlet chamber 309 formed within the intermediate body portion 303 of the gas mixer. One-way valve 181 comprises a stainless steel valve seat 311 clamped between the intermediate body portion 303 of the gas mixer and the outer casing of gas conversion apparatus 36 and a cup shaped valve member 312 biased toward the valve seat by a light biasing spring 313. Spring 313 is stiff enough to close the valve against hydrogen gas flow when the engine is stopped but when the engine is rotated the valve is opened by engine suction to permit the flow of ionized hydrogen into the gas mixer The ionized hydrogen flows from the inlet chamber 309 upwardly through the interior passage 314 of an inlet pipe 315 the construction of which is most clearly seen in FIG. 23. Inlet pipe 315, which may be formed as an aluminium casting, has a thick bottom flange 316 provided with bolt holes 317 to receive bolts 320 whereby it is fastened to intermediate body portion 303 with the lower end of passage 314 in registration with chamber 309. A gasket 318 is fitted between these two components. Inlet pipe 315 is provided with circumferentially spaced vertical ribs 319 and its upper end is fitted with a stainless steel bush 321 which serves as a valve seat for a conical valve member 322 forming part of a vertically movable valve assembly 323 carried on a flexible diaphragm 324.

The upper body portion 301 of the gas mixer has a cylindrical bore 325 and, adjacent its upper end, a radially outwardly projecting circumferential flange 326. It is fastened to intermediate body portion 303 by clamping studs 327 and a gasket 328 is sandwiched between these two body portions.

The outer rim of flexible diaphragm 324 is held between a ring 329 and the outer rim of a domed member 333. Ring 329 has five circumferentially spaced, depending legs 332 which sit on the upper face of flange 326. Domed member 333 and ring 329 are clamped together and to the flange 326 of body portion 301 by a series of circumferentially spaced clamping bolts 334.

The air filter assembly 302 comprises a bottom pan 335 which sits on the outer rim of flange 326, an annular air filter element 337 and an upper pan 338 which is clamped down against domed member 333 by a central clamping screw 339.

The vertically movable valve assembly 323 carried on diaphragm 324 comprises a cap member 341 which fits over the upper end of gas inlet pipe 315, an annular metal plate 342 surrounding cap member 341 on the underside of the diaphragm, a metal disc 343 on the upper side of the diaphragm, and the conical valve member 322. Valve member 322 has an upstanding threaded stem which extends upwardly through a hole in the top wall of cap member 341 and is fitted with a clamping nut 344 so as to fix it to the cap member. Four circumferentially spaced clamping studs 345 fasten the cap member 341, ring 342 and disc 343 to a central part of diaphragm 324 so that the whole assembly can move vertically by flexure of the diaphragm. The assembly is biased downwardly by a helical compression spring 346 acting between cap member 341 and domed member 333.

As will be explained below, valve member 322 cooperates with the valve seat bushing 321 on the upper end of gas inlet pipe 315 to meter the flow of hydrogen through the mixer and metal plate 342 cooperates with the rim 347 at the upper end of body portion 301 to meter the inflow of air to the mixer.

Cap member 341, which may be formed as an aluminium casting, has a series of four ducts 348 extending upwardly through it and these communicate with a diaphragm chamber 349 formed between diaphragm 324 and domed member 333 i.e., the chamber above the diaphragm. Two of these ducts are fitted with stainless steel tubular extensions 351 which extend downwardly through the mixer body portion 301 and into the intermediate body portion 303, as is most clearly seen in FIGS. 19 and 20. Intermediate body portion 303 is formed with dual Venturi-shaped throats 352 and the lower ends of tubes 351 are locked within the smallest area regions of these two throats.

When the engine is in operation, the suction pressure generated in the Venturi throats 352 is applied via tubes 351 and the ducts 348 in cap member 341 to the upper diaphragm chamber 349 so as to raise the diaphragm and the valve assembly 323. Conical valve member 322 is lifted from valve seat bushing 321 of the upper end of gas inlet pipe 315 and metal disc 343 is lifted from the rim 347 of upper body portion 301 so permitting hydrogen gas to flow downwardly between cap member 341 and pipe 315 (via passages defined between the pipe ribs 319) and air to flow downwardly over the flared outer surface of cap member 341. The hydrogen and air thus flow downwardly into the interior of body member 301 to form a mixture which passes to the dual throats 352 of body member 303. The metering of both the hydrogen gas and the air in this way enables a constant ratio mixture to be maintained regardless of throttle settling.

Body portion 305, which is fastened to body portion 303 by clamping studs 354, carries throttle valve apparatus to control engine speed. It has two vertical bores 355, 356, serving as continuations of the dual throats which started in body portion 303 and these are fitted with throttle valve flaps 357, 358 fixed to a common throttle valve shaft 359 by fixing screws 361. Shaft 359 is fitted with a bracket 362 (FIG. 2) via which it is connected as in a conventional petrol carburetter to the engine throttle cable 363 and also to an automatic transmission kick-down control linkage 364. A biasing spring 365 acts on shaft 359 to bias the throttle flaps towards closed positions as determined by engagement of a setting screw 366 carried by bracket 362 with a plate 367 projecting from body portion 305.

Body portion 305 is fastened to the bottom body portion 306 by four clamping studs 368 (FIG. 2). The bottom body portion has two holes 369 which form continuations of the dual throats and which diverge in the downward direction so as to direct the fuel and air mixture delivered through these throats outwardly into the inlet manifold of the engine.

Figure 20:
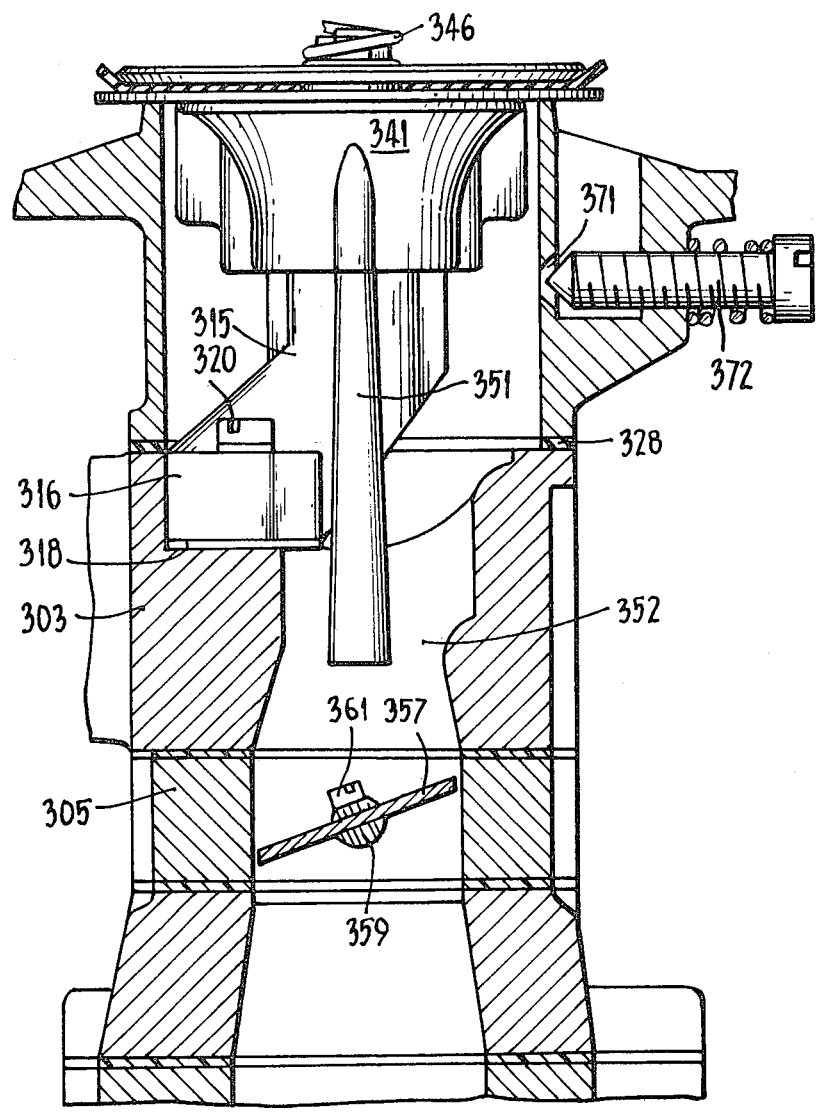
FIG. 20 is a cross-section generally on the line 20—20 in FIG. 19.
Figure 21:
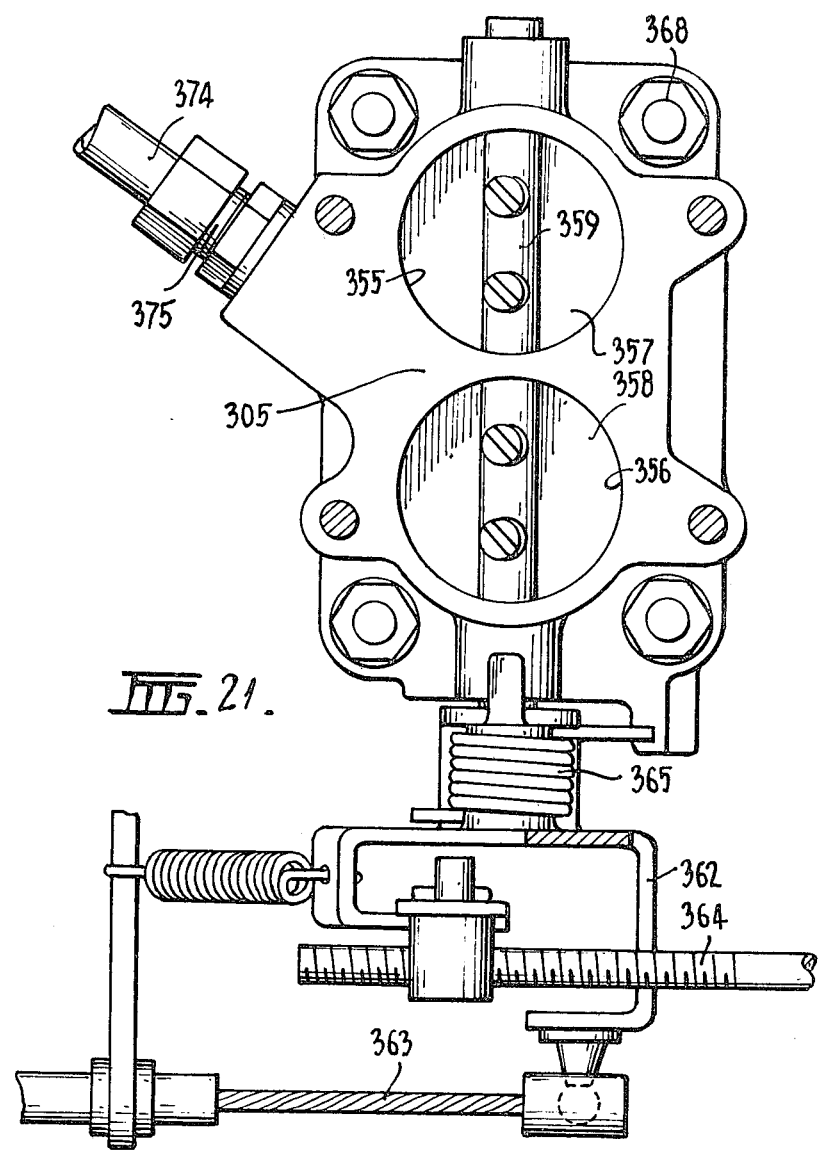
FIG. 21 is a plan view of a lower section of the gas mixer broken away from the upper section along the interface 21—21 of FIG. 3.
Figure 22:
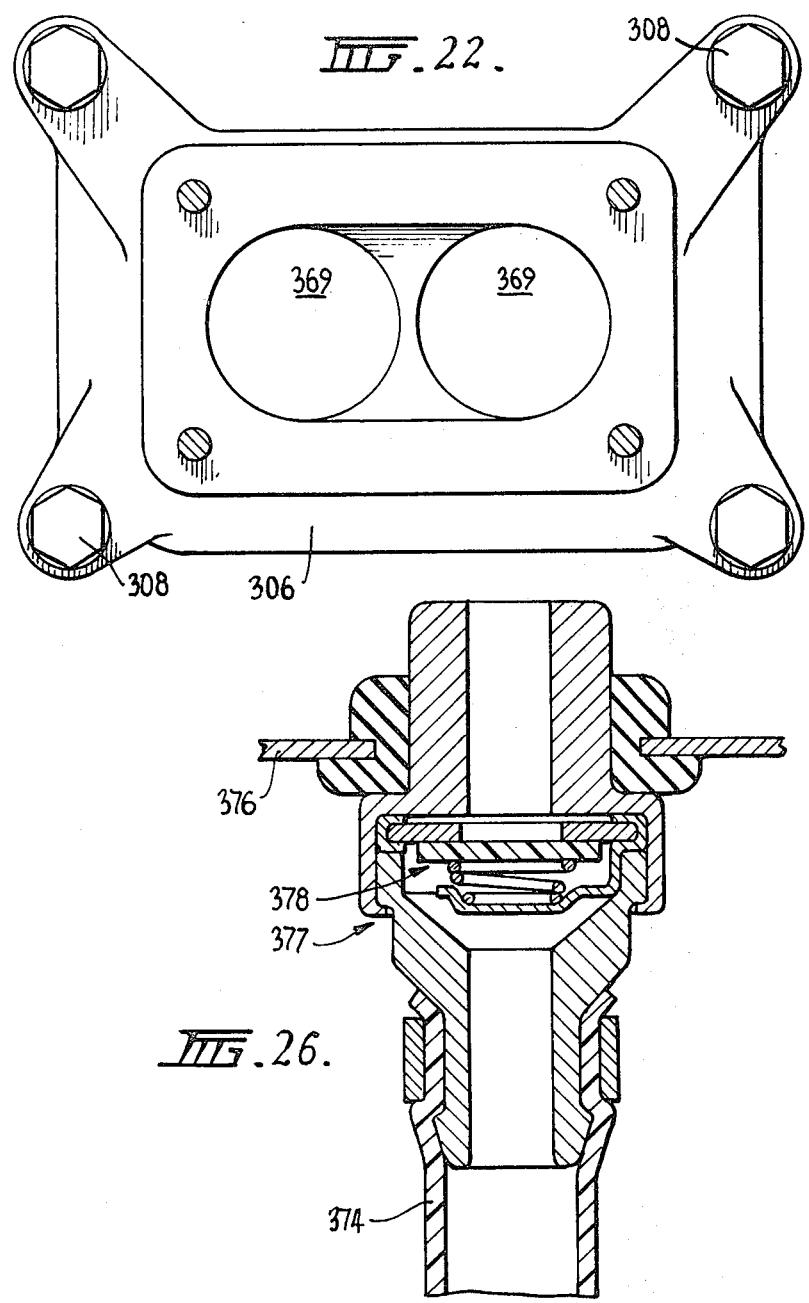
FIG. 22 is a plan of a lower body part of the gas mixer.
Figure 23:
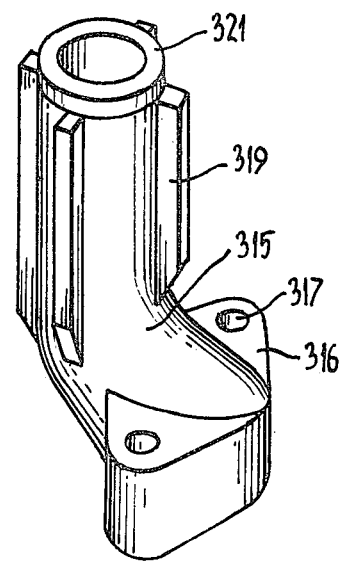
FIGS. 23, 24 and 25 are perspective views of components in the gas mixer.
Figure 24:
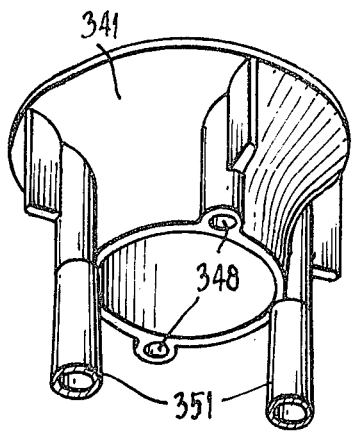
Figure 25:
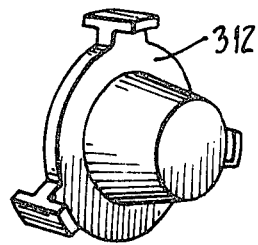

As shown in FIG. 20 the upper body section 301 has an aperture 371 to provide an air bleed on idling of the engine, this air bleed being controlled by the setting of a spring loaded adjustment screw 372.

Since the hydrogen gas is in a dry state, a small quantity of oil vapour extracted from the valve case of the engine is admitted into the gas mixer to mix with the fuel and provide upper-cylinder lubrication. The oil vapour is introduced via a passage 373 formed in body portion 305 which directs the oil vapour downwardly onto the upper face of lower body portion 306 adjacent the fuel flow holes 369 so that it is sucked into the fuel stream through a restricted opening. The oil vapour is drawn through a tube 374 which is connected at one end to the gas mixer body portion 305 by a screw coupling 375 and is connected at its other end to the valve casing 376 of the engine by the connector 377 illustrated in FIG. 26. Connector 377 is fitted with a suction operated one way valve 378 which is operated by suction from the gas mixer when the engine is in operation and which closes when the engine stops.

Figure 28:
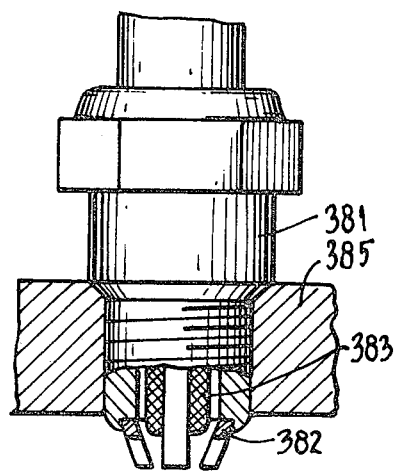
FIGS. 27 and 28 illustrate an electrical discharge device fitted to the engine.
Figure 27:
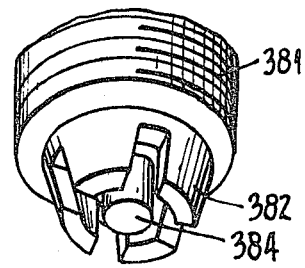

Engine 31 may be of substantially conventional construction and may, for example, be a normal V8 motor vehicle engine except that it is fitted with special electrical discharge devices in lieu of normal spark plugs. These special discharge devices, the construction of which is shown by FIGS. 27 and 28, are designed to create an electrical discharge which will result in dissociation of hydrogen gas within each combustion chamber of the engine to produce atomic hydrogen which, on contact with metal surfaces of the combustion chamber, will reassociate exothermally to produce heat in similar fashion to the heat production in atomic welding processes. The discharge device is formed in similar fashion to a conventional spark plug and comprises an outer metal case 381 which carries an outer generally conical tungsten electrode 382 and which surrounds an inner insulator 383 carrying a central rod-shaped tungsten electrode 384. Outer electrode 382 has three circumferentially spaced slots to ensure that hydrogen gas can pass freely between the two electrodes and to produce three outer electrode tips for spark discharge. The conical tapering of the outer electrode 382 ensures clearly defined discharges at the outer ends of the electrodes and maximum exposure of hydrogen gas to those discharges. The discharge devices are screw-fitted into the engine cylinder head 385 and may be energised by a normal automobile ignition system supplying a high tension voltage of the order of 30,000 volts. However the gap between the two electrodes is significantly larger than the gap of a normal spark plug and may be of the order of 0.040".

The fuel admitted to each cylinder of the engine comprises highly ionised hydrogen gas having a significantly high proportion of deuterium. After the gas has been introduced into a cylinder the combustion chamber 340 is closed by the usual valving and the gas is compressed by the piston to a pressure in excess of 60 p.s.i. An electrical spark discharge is then produced by the respective discharge device so as to generate heat by dissociation of hydrogen molecules to form atomic hydrogen and subsequent exothermal reassociation together with normal combustion of the hydrogen with the oxygen in the combustion chamber. The electrical discharge also causes acceleration of the ionised deuterons in the hydrogen which increases their energy. Moreover, there is a shock wave in the combustion chamber due to the rapid compression of the gas by the piston and the shaping of the combustion chamber. The total energy thus obtained is sufficient to cause the highly ionised deuterium in the hydrogen gas to undergo a controlled nuclear fusion reaction with consequent liberation of energy and the fuel consumption is accordingly very much less than would be achieved by a normal combustion process.

The nuclear fusion reactions which can occur are the D-D reactions:

$$_1D^2 + {}_1D^2 \rightarrow He^3 + {}_0n^1 + 3.27\ \text{Mev}$$

and $$_1D^2 + {}_1D^2 \rightarrow {}_1T^3 + {}_1H^1 + 4.03\ \text{Mev}$$

These reactions are called the "Neutron Branch" and the "Proton Branch" respectively. The tritium produced in the proton branch can react, at a considerably faster rate, with deuterium nuclei in the D-T reaction:

$$_1D^2 + {}_1T^3 \rightarrow {}_2He^4 + {}_0n^1 + 17.6\ \text{Mev}$$

The $He^3$ formed in the first D-D reaction can also react with deuterium in the following way:

$$_1D^2 + {}_2He^3 \rightarrow {}_2He^4 + {}_1H^1 + 18.3\ \text{Mev}$$

The energy liberated by nuclear fusion is additional to that supplied by the normal combustion of hydrogen which provides a control on the fusion reaction by removing hydrogen before potentially dangerous chain reactions can develop.

Apparatus constructed in accordance with the drawings has been manufactured and fitted to a Ford motor vehicle powered by an internal combustion engine of V-8 configuration (Model No. 24337, Engine Y, Transmission R). The engine was originally fitted with a carburettor for petrol operation and with conventional spark plug ignition but these were removed and replaced with the illustrated apparatus for operation in accordance with the present invention. The vehicle has been road tested and performance tests have been carried out on a dynamometer for both petrol operation and operation on hydrogen fuel in accordance with the invention. The following are typical results of the dynamometer tests:

| PETROL OPERATION | |
|---|---|
| Equivalent road speed | 40 m.p.h. |
| Engine speed | 1500 r.p.m. |
| Petrol Consumption | 2.2 imperial gallons/hour. |
| | ≡ 328,240 BTU/hour |
| Power of engine as measured by dynamometer | 23 BHP |
| Since 1 BHP = 2545 BTU, | |
| Thermal efficiency of engine = 17.87% | |
| HYDROGEN OPERATION | |
| Equivalent road speed | 40 m.p.h. |
| Engine speed | 1500 r.p.m. |
| Hydrogen consumption | 720 cu.ft./hour |
| | ≡ 200,880 BTU/hour |
| Power of engine as measured by dynamometer | 30.7 BHP |
| ∴ Thermal efficiency of engine = 38.89% | |

It will be appreciated that the high thermal efficiency of 38.89% achieved in the operation of the engine with the apparatus of the present invention could not be achieved in any engine deriving energy from normal chemical burning of hydrogen. For normal hydrogen combustion, the theoretical maximum efficiency is approximately 25% and in a practical engine of the type tested a maximum efficiency of about 15% would be expected.

During several test runs of the engine using the hydrogen fuel, the helium content of the exhaust gases has been measured by a VARIAN PORTA-TEST 925-40 Mass Spectrometer Leak Detector, as marketed by Varian/Lexington Vacuum Division of Lexington, U.S.A., The helium content was consistently measured at 18 parts per million, including 5.2 parts per million due to naturally occuring atmospheric helium. This significantly high helium content indicates that conversion of deuterium by nuclear fusion has been obtained.

Tests have also been carried out to detect the presence of neutrons generated within the engine. During several test runs of the engine Indium 115 foil (0.5 mm thick) was mounted on areas of indicated minimum shielding. Statistically significant gamma activity resulting from decay Indium 116 m was detected using a lead shielded sodium iodide scintillation crystal. Simultaneously, neutron sensitive film (KODAK LR115 type 2B and 80-15 type 1B) were attached to similar regions of interest on the engine. On developing the films, neutron activity over the zones of indicated minimum shielding were evident.

Tritium measurements on condensed steam from the exhaust, when counted by liquid scintillation techniques, indicated detectable count levels in the condensate.

The illustrated apparatus has been advanced by way of example only and it is to be understood that the invention is not limited to that particular apparatus, nor to the specific field of automobile engines. The invention will have broad application to mobile and static power generating plant, including electrical power generating equipment. Although the illustrated apparatus produces an appropriate form of hydrogen fuel by conversion of industrial hydrogen gas, it is possible to produce such fuel by conversion of water by apparatus of the type disclosed in U.S. Pat. No. 4,107,668. That apparatus converts water to hydrogen gas in suitable form for the present invention, as well as oxygen which can serve as at least part of the oxidising gas in the process of the present invention.

I claim:

1. Apparatus comprising, in combination:
   gaseous fuel burning plant having a combustion chamber to receive gaseous fuel;
   means to produce ionised hydrogen gas, including a radiation tube, a vessel defining an annular gas flow passage surrounding said radiation tube for flow of a hydrogen gas therethrough, and electrical supply means to supply energy to the radiation tube so as to produce electromagnetic radiation of wavelength less than $10^{-10}$ meters to irradiate hydrogen gas flowing through said passage;
   means to introduce said ionised hydrogen gas together with an oxidising gas into said chamber; and
   means to create an electrical discharge within the chamber.

2. Apparatus as claimed in claim 1, wherein said passage is defined between inner and outer tubular electrodes and said electrical supply means is also connected to those electrodes to apply an electrical potential difference between them.

* * * * *